(No Model.)
W. B. POTTER.
REGULATING INDUCTION MOTOR.
No. 558,104. Patented Apr. 14, 1896.
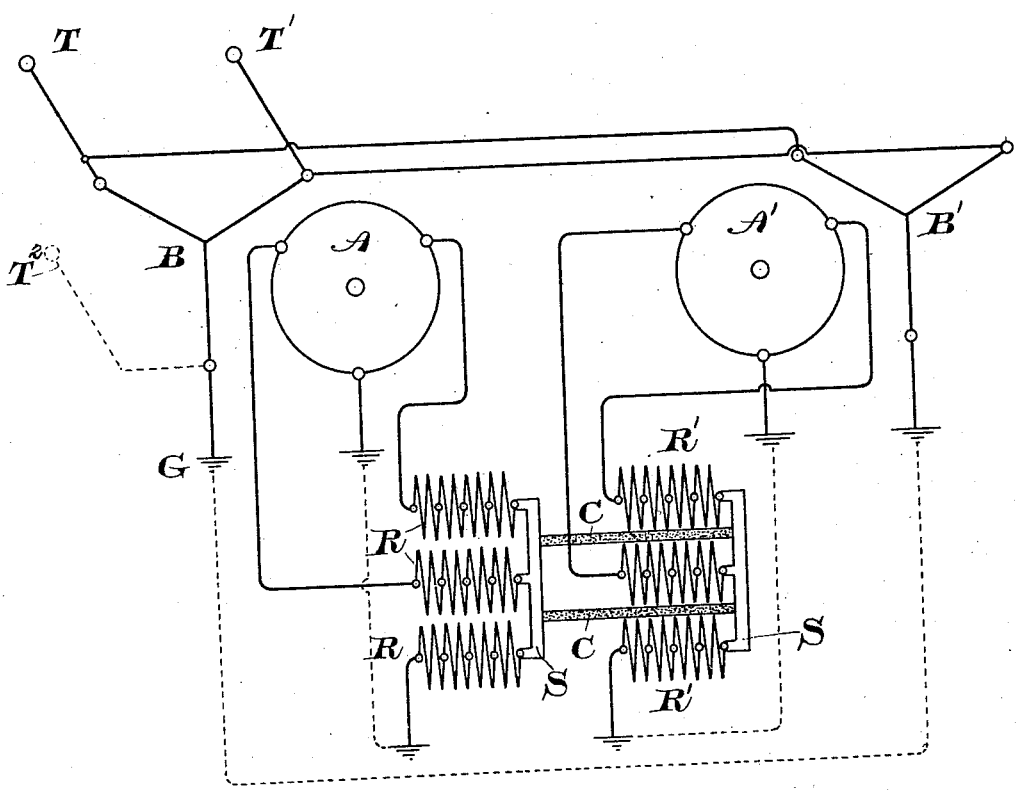
WITNESSES.
A. J. Macdonald
A. H. Abell.
INVENTOR.
William B. Potter, by
Geo. R. Blodgett,
Atty.

UNITED STATES PATENT OFFICE.

WILLIAM B. POTTER, OF SCHENECTADY, NEW YORK, ASSIGNOR TO THE GENERAL ELECTRIC COMPANY, OF NEW YORK.

REGULATING INDUCTION-MOTORS.

SPECIFICATION forming part of Letters Patent No. 558,104, dated April 14, 1896.

Application filed January 15, 1896. Serial No. 575,560. (No model.)

*To all whom it may concern:*

Be it known that I, WILLIAM B. POTTER, a citizen of the United States, residing at Schenectady, in the county of Schenectady, State of New York, have invented certain new and useful Improvements in Regulating Induction-Motors, (Case No. 270,) of which the following is a specification.

My invention relates to the regulation of induction-motors, particularly as applied to tramway-work. The ordinary, and in many cases preferred, method of regulation of such motors is by the now well-known "tandem parallel" system; but in some cases, on account of the complication of connections required in that system, I have found it desirable to use resistance control. This is particularly true where the great torque of motors in multiple is desired in starting and where stops are infrequent, as in long-distance electric railways, in which case long runs being made with the motors in multiple with all the resistance cut out they are working at their maximum efficiency, and the slight loss of efficiency over the tandem multiple system in starting and at moderate speeds is immaterial.

For the purposes of my invention therefore I connect the motors permanently in multiple between the trolley-lines and ground, or between the supply-lines, if three metallic conductors be used, in the three-phase system which I have taken as a convenient illustration. The circuit of each armature I close through resistances, and these resistances I so connect that they may be operated simultaneously. Nothing in my invention limits it to the use of trolley-lines or to railway-work alone.

The accompanying drawing shows a diagram of my invention, in which—

A A' are armatures; B B', the fields, the latter indicated merely by straight lines as a convenient illustration. The two fields are permanently connected in multiple between the trolleys T T' and the ground at G. I have indicated that a third trolley may be used, as shown by the trolley $T^2$ in dotted lines, and in this case a metallic connection may be substituted, as shown by the dotted-line connections in the circuit of the armatures. Resistances R R', &c., are shown closing the circuits of the armatures, and means, such as a slider S, for cutting out these resistances in variable amounts or for bringing the armatures upon dead short-circuit are also used. These are connected by bars C C, so that the operation of one simultaneously operates the other.

It is preferred that the resistances shall be arranged in the armature of each motor and that a number of contacts may be arranged upon the shaft, so that they may be short-circuited in varying amounts, as this arrangement dispenses with sliding contacts; but this is not an essential feature of my invention, nor is it new with me.

What I claim as new, and desire to secure by Letters Patent of the United States, is—

1. The method of regulating alternating-current motors of the induction type, which consists in connecting the fields permanently in multiple between the supply-lines, closing the circuits of the armatures through separate simultaneously-variable resistances, and varying the resistances to regulate the speed of the motors.

2. In combination, alternating-current supply-lines, induction-motors having their fields permanently connected in multiple between such lines and the circuits of their armatures closed through resistances, and means for simultaneously varying the resistance in the armature of each of the motors.

In witness whereof I have hereunto set my hand this 13th day of January, 1896.

WILLIAM B. POTTER.

Witnesses:
B. B. HULL,
A. F. MACDONALD.